US011890801B2

(12) United States Patent
Hanson et al.

(10) Patent No.: US 11,890,801 B2
(45) Date of Patent: Feb. 6, 2024

(54) METHOD AND SYSTEM FOR PROCESSING AN EXTRUDED SHEET

(71) Applicant: Processing Technologies International, LLC, Aurora, IL (US)

(72) Inventors: Dana R. Hanson, St. Charles, IL (US); Mitchell L Gritzner, Montgomery, IL (US)

(73) Assignee: Processing Technologies International, LLC, Aurora, IL (US)

( * ) Notice: Subject to any disclaimer, the term of this patent is extended or adjusted under 35 U.S.C. 154(b) by 497 days.

(21) Appl. No.: 16/536,519

(22) Filed: Aug. 9, 2019

(65) Prior Publication Data

US 2021/0039297 A1 Feb. 11, 2021

(51) Int. Cl.
*B29C 48/88* (2019.01)
*B29C 48/08* (2019.01)
*B29C 48/90* (2019.01)
*B29C 48/92* (2019.01)

(52) U.S. Cl.
CPC .......... *B29C 48/914* (2019.02); *B29C 48/08* (2019.02); *B29C 48/906* (2019.02); *B29C 48/92* (2019.02); *B29C 2948/92704* (2019.02)

(58) Field of Classification Search
CPC ....... B29C 48/914; B29C 48/92; B29C 48/08; B29C 48/906
See application file for complete search history.

(56) References Cited

U.S. PATENT DOCUMENTS

| | | | |
|---|---|---|---|
| 2,151,476 A * | 3/1939 | Kimble | C08K 5/12 106/170.31 |
| 3,558,580 A * | 1/1971 | Orser | B29C 48/001 526/348.1 |
| 4,113,935 A | 9/1978 | Schippers et al. | |
| 4,307,049 A | 12/1981 | Winstead | |
| 4,311,658 A | 1/1982 | Nicoll | |
| 4,408,974 A | 10/1983 | Comerio | |
| 4,436,685 A | 3/1984 | Emura et al. | |
| 6,575,726 B1 | 6/2003 | Nissel | |
| 7,165,962 B2 | 1/2007 | Hanson | |
| 7,172,713 B2 | 2/2007 | Arai et al. | |

(Continued)

*Primary Examiner* — Joseph S Del Sole
*Assistant Examiner* — John Robitaille
(74) *Attorney, Agent, or Firm* — Wood, Phillips, Katz, Clark & Mortimer (57) ABSTRACT

A method and system for processing a heated flexible sheet, with oppositely facing surfaces, that is advanced in a processing path. A first cooling roll has a first peripheral surface for contacting one of the sheet surfaces. A second cooling roll has a second peripheral surface for contacting the other sheet surface. The system is configured so that the first and second cooling rolls are selectively movable in relationship to each other in a manner, other than by moving one or both of the first and second cooling rolls towards or away from the flexible sheet, between: a) a first relationship wherein the first sheet surface is caused to engage the first peripheral surface over a first circumferential extent as the flexible sheet is advanced in the processing path; and b) a second relationship wherein the first sheet surface is caused to engage the first peripheral surface over a second circumferential extent that is different than the first circumferential extent as the flexible sheet is advanced in the processing path.

20 Claims, 4 Drawing Sheets

(56) References Cited

U.S. PATENT DOCUMENTS

| | | |
|---|---|---|
| 9,427,906 B2 | 8/2016 | Krampf et al. |
| 9,616,606 B2 | 4/2017 | Roth |
| 2010/0109180 A1 | 5/2010 | Becker et al. |

* cited by examiner

METHOD AND SYSTEM FOR PROCESSING AN EXTRUDED SHEET

BACKGROUND OF THE INVENTION

Field of the Invention

This invention relates to extrusion forming and, more particularly, to a method and apparatus for processing an extruded sheet initially at a temperature elevated during the formation process.

Background Art

A multitude of different systems are currently being used to extrusion form sheets from a molten starting material. The sheet products range widely in terms of materials used, thicknesses, number of layers, etc.

During the extrusion process, the starting material is heated to be placed in a molten state which allows the controlled distribution of the material to produce a sheet form. Following the initial application of the molten material against the forming structure, such as cooperating rolls, a number of other processing steps will be performed on a running web of the sheet before the sheet product realizes its completed state at room temperature. For example, roll stacks are routinely used, with the heated sheet strategically guided through cooperating roll pairs thereon which process the sheet so that it is substantially in its final form and thickness.

The applicant herein has a number of patents in which this basic technology is described—U.S. Pat. Nos. 9,182,067; 9,139,393; 8,631,925; 8,342,118; 8,240,180; 8,152,509; 8,021,140; and 7,165,962 the disclosures of which are incorporated herein by reference.

Typically, the final processing of the sheet, preparatory to accumulation at a downstream location, involves lowering the temperature thereof to effectively set the materials thereof in a final shape. Cooling of extruded sheets at an elevated temperature may often be the greatest challenge to production efficiency. While sheet generation may be increased by, for example, purchasing higher output extrusion equipment, cooling must generally be carried out at a slower rate. Commonly used plastics shrink at a high rate when molten and thus are prone to a high degree of distortion if not cooled under controlled conditions, which could create a bottleneck in a production line.

While several different techniques are used to cool the sheets, one common technique involves using cooling rolls that engage the sheet downstream of the location at which its basic form is established, but at which it resides at an elevated temperature.

Typically, paired cooling rolls will cooperate by pinching the running web of sheet material as it progressively moves to an appropriate accumulation station, at which the sheet may be rolled, cut, or otherwise processed.

Commonly, a plurality of cooperating cooling roll pairs will be provided along the travel path of the running web to provide interval support adequate that there is not detrimental sag that may impart an unwanted bend, wrinkle, twist, bow, or other unwanted contour that becomes set in the sheet.

The cooling roll arrangement was devised to cause the same cooling to be effected from opposite sides of the sheet, thereby avoiding heat variations on the opposite sides of the sheet that may cause it to bend, warp, wrinkle, etc.

With thin sheet materials, the point contact between two cooling rolls may be adequate to uniformly cool the sheet without significant unwanted deformation. However, with a thicker sheet the cooling process takes longer, aggravated by the fact that commonly used plastics are good thermal insulators, and there is a tendency of there to be temperature variations through the thickness that cause distortion of the sheet. To address this issue and allow more rapid cooling of thicker sheets, roll arrangements have been configured so that the sheet tends to wrap circumferentially through an angle that allows greater contact area with a cooled roll surface that causes more efficient heat dissipation.

Typically, cooling systems are designed to operate with either point contact or a limited range of wrap that is built into the particular system. Thus, systems generally become dedicated to a limited range of sheet thicknesses and may also be limited in terms of how they effectively cool different materials making up the sheets.

As a result, end users of these types of systems must either limit lines to a particular sheet configuration or contend with the inconvenience of having to interchange parts that will optimize performance at the cooling stage of the system by an appropriate selection of number and types of cooling roll pairs.

Designers of these systems strive to offer their customers systems that are affordable at initial setup and which are versatile and efficient in operation. Complex system reconstruction may require skilled labor which may involve a considerable expense. Further, while systems are being reconfigured they are "down", which compromises efficiency.

As an alternative to being able to reconfigure a system, multiple systems may be provided at a particular site, which require substantial space, involve potentially high up-front investment, and individually require ongoing supervision, maintenance, and repair.

The industry continues to seek out system designs that address the above objectives, which often compete with each other.

SUMMARY OF THE INVENTION

The invention is directed to a system for processing a flexible sheet that is not fully thermally set and advanced in a processing path between an upstream location and a downstream location following an extrusion forming process. The sheet has first and second oppositely facing surfaces. The system includes: at least a first cooling roll having a first peripheral surface for contacting the first sheet surface and movable around a first axis; and at least a second cooling roll having a second peripheral surface for contacting the second sheet surface and movable around a second axis. The first and second cooling rolls have an operative relationship wherein the first and second axes are substantially parallel. The system is configured so that the first and second cooling rolls are mounted to be selectively movable in relationship to each other in a manner, other than by moving one or both of the first and second cooling rolls in a direction towards or away from the flexible sheet, between: a) a first relationship wherein the first sheet surface is caused to engage the first peripheral surface over a first circumferential extent as the flexible sheet is advanced in the processing path; and b) a second relationship wherein the first sheet surface is caused to engage the first peripheral surface over a second circumferential extent that is different than the first circumferential extent as the flexible sheet is advanced in the processing path.

In one form, the at least one of the first and second cooling rolls is temperature controlled so that a temperature of at least one of the first and second peripheral surfaces is below ambient temperature.

In one form, at least one of the first and second cooling rolls is driven to cause a respective peripheral surface thereon to generate a frictional driving force tending to move the flexible sheet in the processing path.

In one form, only one of the first and second cooling rolls is movable relative to the other of the first and second cooling rolls in changing the first and second cooling rolls between the first and second relationships.

In one form, with the first and second cooling rolls in the first relationship, there is substantially a point contact of the flexible sheet with each of the first and second cooling rolls.

In one form, the at least first cooling roll consists of the first cooling roll and a third cooling roll with a third axis. The at least second cooling roll consists of the second cooling roll and a fourth cooling roll with a fourth axis.

In one form, the system has a carriage to which the first and third cooling rolls are mounted to be maintained in a fixed relationship. The carriage is movable relative to the second and fourth cooling rolls to change the first and second cooling rolls between the first and second relationships.

In one form, the third and fourth cooling rolls have the same relationship with each other as the first and second cooling rolls have with each other.

In one form, a first plane containing the first and second axes is substantially parallel to a second plane containing the third and fourth axes.

In one form, the first axis resides midway between the second and fourth axes along the processing path.

In one form, the at least second cooling roll includes the second cooling roll, the fourth cooling roll, and a fifth cooling roll with a fifth axis. The carriage is movable into one position wherein the first cooling roll has the same relationship with the second and fourth cooling rolls as the relationship the third cooling roll has with the fourth and fifth cooling rolls.

In one form, with the carriage in the one position the flexible sheet is captive between: a) the first cooling roll and the second and fourth cooling rolls; rolls; and b) the third cooling roll and the fourth and fifth cooling rolls. The carriage is movable into a second position that is different than the one position wherein: i) the flexible sheet is captive between the first and second cooling rolls and the third and fourth cooling rolls; and ii) the flexible sheet is not captive between the third and fifth cooling rolls.

In one form, the carriage is movable selectively towards and away from a plane containing the second and fourth cooling roll axes.

In one form, the system further includes a drive assembly generating a force downstream of the carriage for advancing the flexible sheet in the processing path.

In one form, there is a slip clutch on the at least one of the first and second cooling rolls that is driven.

In one form, the system is provided in combination with the flexible sheet.

In one form, the invention is directed to a method of processing a flexible sheet. The method includes the steps of: obtaining the system described above; forming the flexible sheet through an extrusion process; and with the flexible sheet not fully set and in a heated state, advancing the flexible sheet in the processing path.

In one form, the method further includes the steps of changing a state of the sheet processing system at different times and operating the system in: a) a first state wherein the advancing flexible sheet moves between the first and second cooling rolls without being captive between the first and second cooling rolls; b) a second state wherein the advancing flexible sheet contacts the first peripheral surface of the first cooling roll over the first circumferential extent and the second cooling roll with the first and second cooling rolls in the first relationship; and c) a third state wherein the advancing flexible sheet contacts the first peripheral surfaces of the first cooling roll over the second circumferential extent and the second cooling roll with the first and second cooling rolls in the second relationship.

In one form, the method further includes the step of calibrating the flexible sheet between the first and second cooling rolls with the system in the second state.

In one form, the at least first cooling roll is made up of the first cooling roll and a third cooling roll with a third axis. The at least second cooling roll is made up of the second cooling roll and a fourth cooling roll with a fourth axis. The system further includes a carriage to which the first and third cooling rolls are mounted to be maintainable in a fixed relationship. The carriage is movable relative to the second and fourth cooling rolls to change the first and second cooling rolls between the first and second relationships.

In one form, the method includes the step of moving the carriage to thereby move the first cooling roll selectively towards and away from a plane containing the second and fourth axes.

In one form, the method includes the step of moving the carriage to thereby move the first and third cooling rolls along the processing path and relative to the second and fourth cooling rolls.

In one form, the flexible sheet has a thickness of at least 3 millimeters.

DETAILED DESCRIPTION OF THE PREFERRED EMBODIMENT

Figure 1:
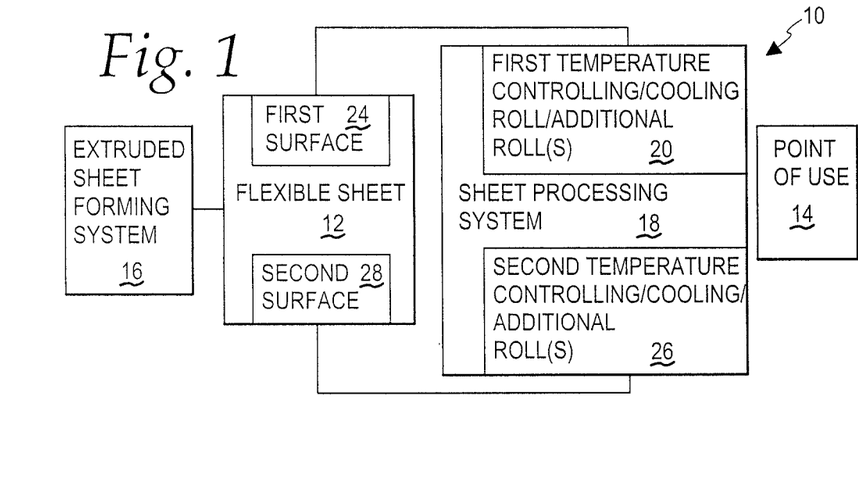
FIG. 1 is a schematic representation of a production line for extrusion forming sheets and incorporating a sheet processing system according to the invention.

In FIG. 1, a production line is shown schematically at 10 used to extrusion form a flexible sheet 12, which is ultimately delivered to a downstream point of use at 14.

As indicated in the Background section herein, a multitude of systems currently exist for extrusion forming a flexible sheet 12, as schematically depicted. The invention is not concerned with the precise nature of the flexible sheet 12 in terms of composition or thickness, or the precise manner in which it is fabricated. The extruded sheet 12 may be made by any such system, as depicted schematically in FIG. 1 at 16. Exemplary components and setups for extrusion sheet forming are described in the Applicant's above-identified patents, which are incorporated herein by reference. It suffices to say that, regardless of the nature of the system 16, at least the core of the resulting flexible sheet 12 remains at an elevated temperature immediately downstream of the forming system 16, by reason of the sheet material being placed in a molten state during the extrusion forming process, whereby the flexible sheet 12 is not fully set. It is in this state that the flexible sheet 12 is conditioned by the sheet processing system 18 according to the invention.

The flexible sheet 12 may have a discrete length or may be a running web that is continuously conditioned by the sheet processing system 18.

Similarly, the nature of the flexible sheet 12 delivered to the point of use 14 is not critical to the present invention. The point of use 14 may be a simple accumulation station or a station at which further processing of the flexible sheet 12 may take place.

In its simplest form, the sheet processing system 18 has at least a first temperature controlling roll 20, with potentially one or more additional rolls, that cooperate with a first surface 24 on the flexible sheet 12. A second temperature controlling roll 26, with potentially one or more additional rolls, act against a second surface 28 on the flexible sheet 12 facing oppositely to the first surface 24 thereon.

Figure 2:
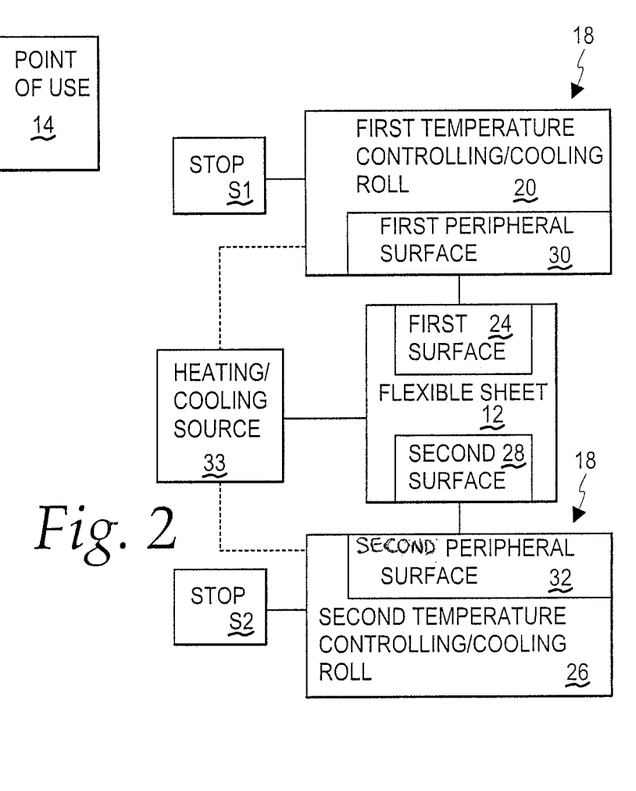
FIG. 2 is a schematic representation of the sheet processing system in FIG. 1 cooperating with a flexible, extruded sheet.

As shown schematically in FIG. 2, the first temperature controlling roll 20 has a first peripheral surface 30 for contacting the first surface 24 on the flexible sheet 12. The second temperature controlling roll 26 has a second peripheral surface 32 for contacting the second sheet surface 28.

The flexible sheet 12 moves in a processing path between an upstream location, where the flexible sheet departs the extruded sheet forming system 16, and a downstream location at the point of use 14. Between the extruded sheet forming system 16 and the point of use 14, the flexible sheet 12 is conditioned by the sheet processing system 18. The sheet processing system 18 is reconfigurable to cause at least the first and second temperature controlling rolls 20, 26 to cooperate with each other in different manners to thereby selectively control how the flexible sheet 12 interacts with the roll peripheral surfaces 30, 32 thereon.

It should be understood that the temperature controlling rolls 20, 26 will typically be at temperatures below the temperature of the core of the flexible sheet 12 as treatment occurs. Thus, in that respect, the temperature controlling rolls 20, 26 effect sheet cooling through their respective surfaces 30, 32 even though the temperature of one or both of the surfaces 30, 32 may be above the environmental temperature. For purposes of simplicity, throughout the description and claims herein, the temperature controlling rolls 20, 26 will be characterized as "cooling" rolls, even though one or both of the rolls 20, 26 may be heated above the environmental temperature in a space within which the sheet treatment is taking place.

Further, it should be understood that one or both of the cooling rolls 20, 26 may be at room temperature or heated or cooled through a conventional source of heating or cooling, as shown schematically at 33 in FIG. 2. The surfaces 30, 32 may be at the same or different temperatures, with the understanding that it may be desirable to control cooling of the sheet 12 to produce a planar shape or one that is curled, or set in another shape, in a controlled manner through the selection of the cooling roll configuration, interaction, and temperature.

The sheet processing system 18 is configured so that the first and second cooling rolls 20, 26 are mounted to be selectively movable in relationship to each other, in a manner other than by moving one or both of the first and second cooling rolls 20, 26 directions towards or away from the flexible sheet 12, between: a) a first relationship, wherein the first sheet surface 24 is caused to engage the first peripheral surface over a first circumferential extent as the flexible sheet 12 is advanced in the processing path; and b) a second relationship, wherein the first sheet surface 24 is caused to engage the first peripheral surface 30 over a second circumferential extent that is different than the first circumferential extent as the flexible sheet 12 is advanced in the processing path.

Figure 3:
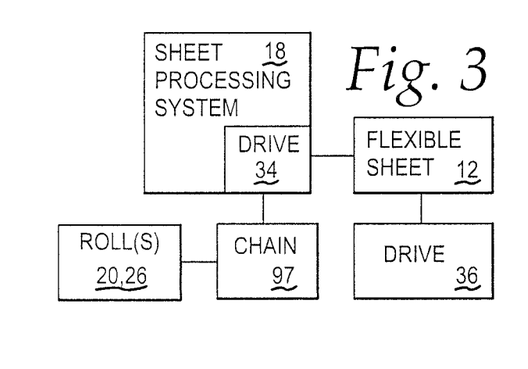
FIG. 3 is a schematic representation of different potential drives for advancing the flexible sheet in a processing path through the sheet processing system.

In FIG. 3, alternative forms of advancing the flexible sheet in the processing path are depicted. The sheet processing system 18 is shown to incorporate one form of drive 34. The schematic showing of the drive 34 is intended to encompass a structure wherein one or more of the cooling rolls are driven to advance the flexible sheet 12. Alternatively, an independent drive structure can be integrated into the sheet processing system 18.

Alternatively, and/or in addition to the drive 34, a drive 36 is depicted. The drive 36 may independently drive the flexible sheet 12 or may be coordinated with the drive 34 on the sheet processing 18 to effect, together therewith, advancement of the flexible sheet 12 in the processing path.

Referring to FIGS. 4-9, more specific details of the inventive sheet processing system 18 will now be described.

Figure 4:
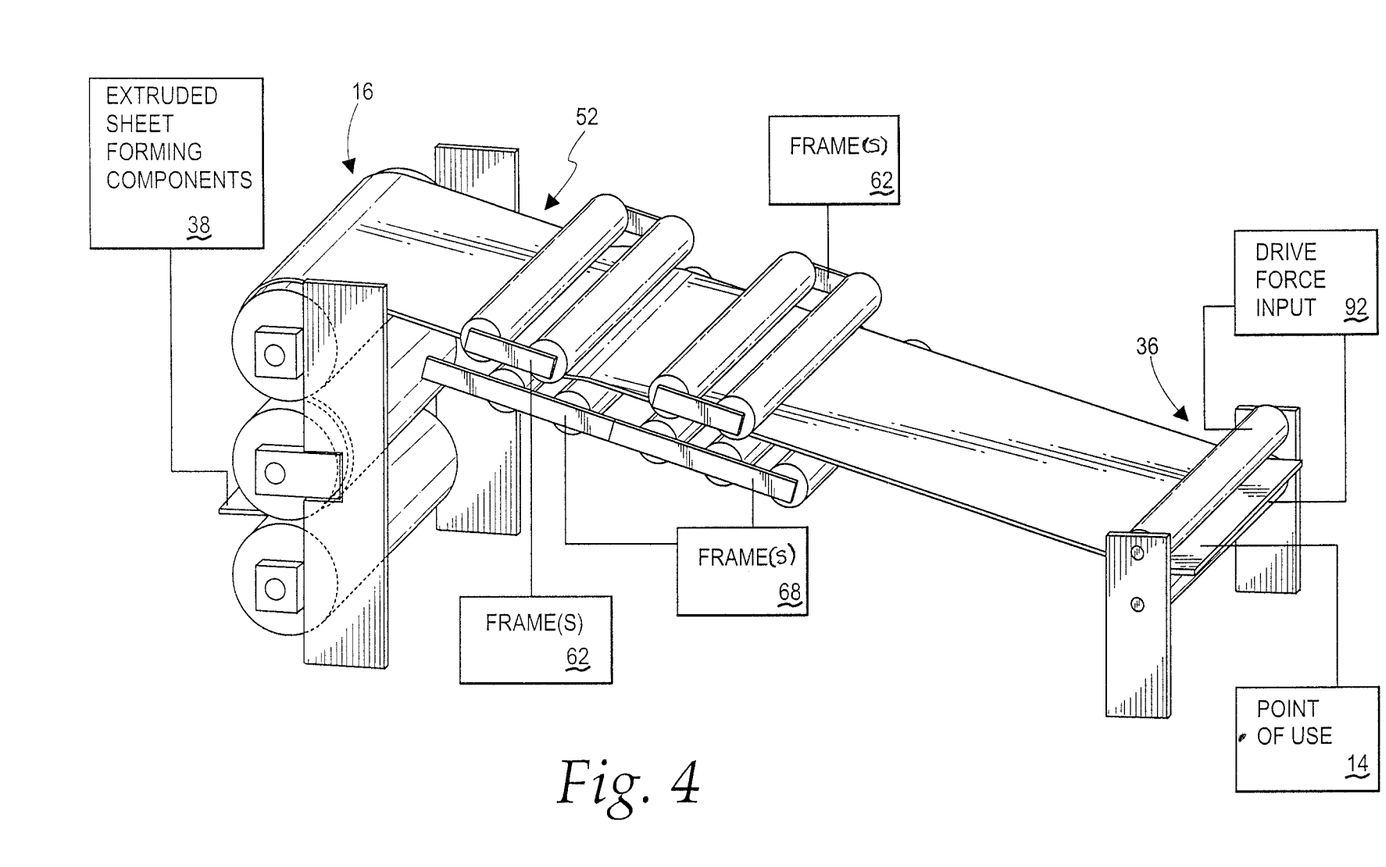
FIG. 4 is a partially schematic, perspective view of one specific form of the inventive sheet processing system incorporated into a production line.
Figure 5:
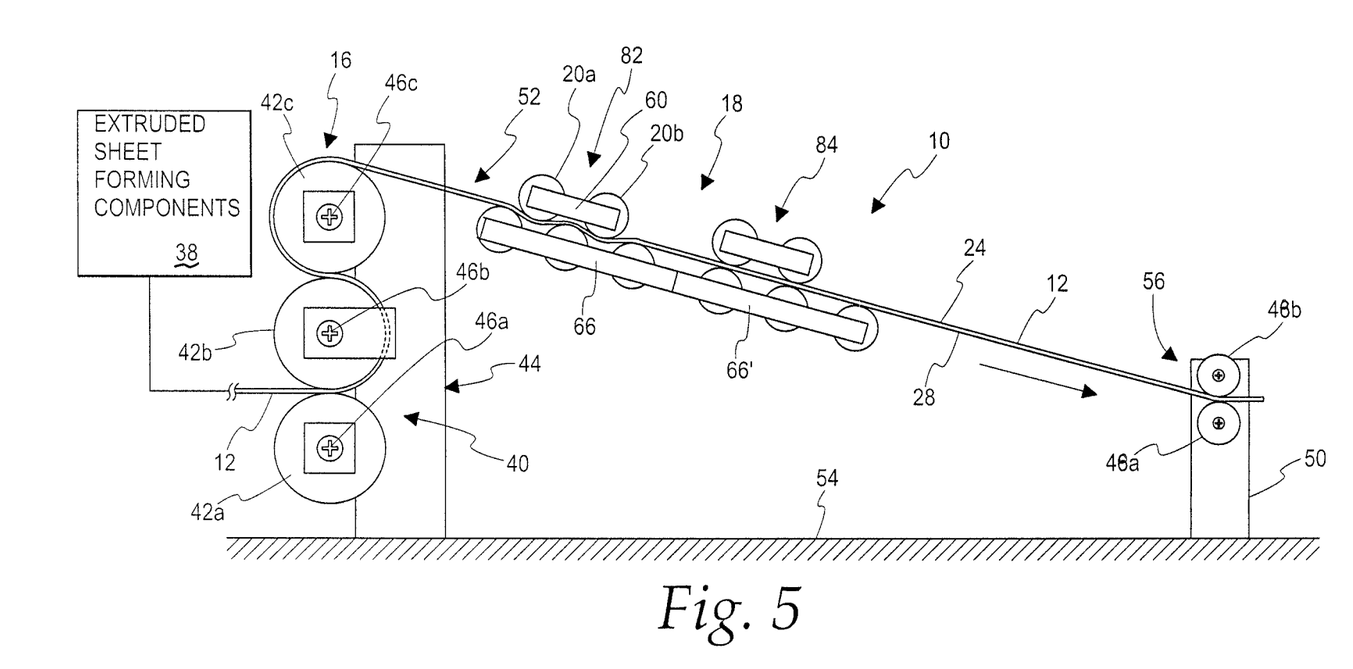
FIG. 5 is a side elevation view of the production line in FIG. 4.

The aforementioned extruded sheet forming system at 16 consists of various extruded sheet forming components 38 which generate the sheet configuration. In this embodiment, the extruded flexible sheet/sheet configuration 12 is directed to a roll stand 40, consisting of three cooperating rolls 42a, 42b, 42c mounted on a frame 44 for turning around parallel axes 46a, 46b, 46c, successively. As depicted, the sheet form moves between the rolls 42a, 42b, wraps through approximately 180° around the roll 46b, moves between the rolls 42b, 42c, wraps through approximately 180° around the roll 42c, and departs therefrom at a downward angle and moves in a substantially straight line processing path to between a downstream roll pair 48a, 48b supported on a frame 50 and spaced from the upstream location at 52 whereat the flexible sheet 12 separates from the upper roll 42c. The frames 44, 50 may be part of a unitary structure upon a support surface 54, or independent structures.

As noted above, the precise formation and treatment of the flexible sheet 12 up to the upstream location 52 is not critical to the present invention. As just examples, the roll stand 40 may be a structure that joins multiple layers, effects calibration, surface treats, etc. It is only significant that the flexible sheet 12 at the upstream location 52 is at an elevated temperature by reason of being extrusion formed and is thus not fully thermally set at that location.

The rolls 48a, 48b perform a sheet routing function to dictate the processing path. The rolls 48a, 48b may be dedicated to routing the flexible sheet 12. Alternatively, they may draw the flexible sheet 12 in its processing path from the depicted downstream location by themselves or in conjunction with another drive (not shown).

While just representative of a system layout, the primary cooling in the production line 10, carried out through the sheet processing system 18, occurs in the region between the upstream location 52 and a downstream location 56 whereat the flexible sheet 12 enters to between the rolls 48a, 48b.

As depicted, there are multiple rolls acting against the first flexible sheet surface 24 with multiple rolls acting against the oppositely facing second flexible sheet surface 28.

As noted above, in the simplest form of the sheet processing system 18, only a first cooling roll 20a with a peripheral surface 30a is required to engage the first sheet surface 24, and only a single second cooling roll 26a with a second peripheral surface 32a is required to engage the oppositely facing flexible sheet surface 28.

A cooling source 58, of any conventional construction, is utilized to produce a desired temperature at the peripheral surfaces 30a, 32a to effect cooling of the advancing flexible sheet 12 brought into contact therewith. Coordinated temperature control can be effected to maximize rate of cooling without inducing deformation as the material making up the flexible sheet 12 advances and becomes thermally set.

In this embodiment, the first roll 20a is provided on a support/carriage 60 which is mounted to a frame 62 through a structure 64.

The second cooling roll 26a is similarly carried on a support/carriage 66 mounted to a frame 68 through an appropriate structure 70.

The frames 62, 68 can be independent structures or part of a unitary frame structure which may also include one or both of the frames 44, 50. The details of how the various rolls are mounted is not critical to the present invention, so long as they have the capability of relatively moving and operating as described hereinbelow.

The first cooling roll 20a has an axis 72 around which it turns, with the second cooling roll 26a having an axis 74 around which it turns. The axes 72, 74 are substantially parallel, with the first and second cooling rolls 20a, 26a in an operative relationship, as shown in FIGS. 4-9.

Figures 6, 7, 8, 9:
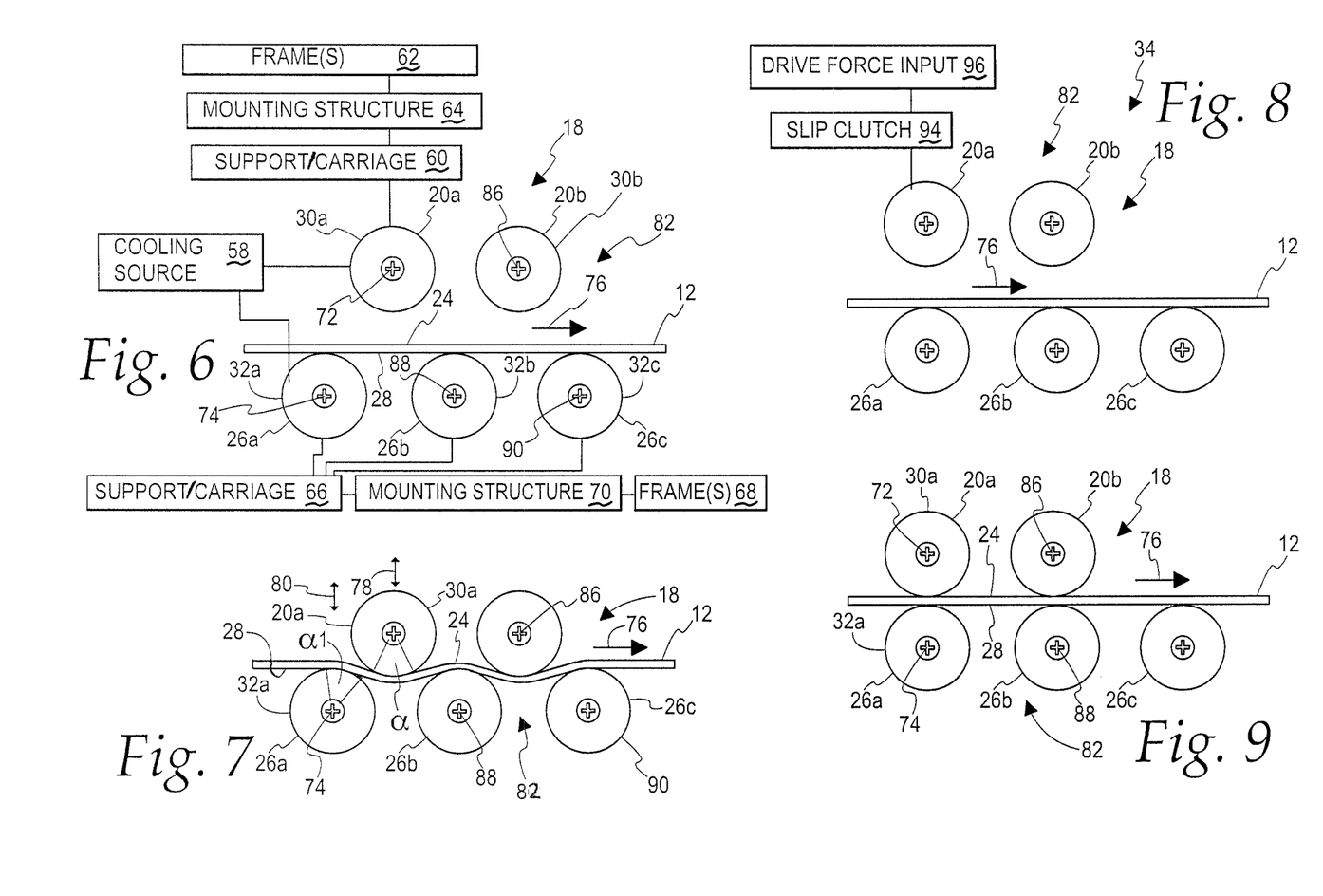
FIG. 6 is a schematic representation of a roll arrangement on the sheet processing system in FIGS. 4 and 5 with the sheet processing system in a first state wherein a flexible sheet can be advanced between rolls without being captively engaged thereby.
FIG. 7 is a view as in FIG. 6 but with the sheet processing system in a different state, with the rolls in one relationship, and wherein the flexible sheet is captively engaged between rolls acting against opposite surfaces thereof.
FIG. 8 is a view as in FIG. 6 with the sheet processing system in a first state, corresponding to that in FIG. 6, and with the rolls in different relationships with each other than in FIG. 6.
FIG. 9 is a view as in FIG. 8 wherein the relationship between rolls on opposite sides of the sheet has been changed to produce a captive arrangement for the flexible sheet.

The sheet processing system 18 has two different states described with a system configuration using only the first and second cooling rolls 20a, 26a. FIGS. 6 and 8 show a first state for the sheet processing system 18 with the first and second cooling rolls 20a, 26a in different relationships. In each of FIGS. 6 and 8, the flexible sheet 12 advancing in the processing path in a conveying direction, indicated by the arrow 76, moves between the first and second cooling rolls 20a, 26a without being captive between the first and second cooling rolls 20a, 26a.

In FIG. 9, the sheet processing system 18 is changed from the first state of FIG. 8, with the first cooling roll 20a and second cooling roll 26a shown in the aforementioned first relationship, wherein the flexible sheet surface 24 is caused to engage the first peripheral surface 30a over a first circumferential extent thereof while the flexible sheet surface 28 is caused to engage the second peripheral surface 32a over substantially the same circumferential extent that the flexible sheet surface 24 and peripheral surface 30a are engaged. Essentially, this is a tangential point contact of the flexible sheet 12 with each of the first and second cooling rolls 20a, 26a. As depicted, though not required, the axes 72, 74 in FIG. 9 reside in a plane that is substantially orthogonal to the line of the portion of the processing path as shown in FIG. 9 that extends therebetween.

The first and second cooling rolls 20a, 26a may be movable between the FIGS. 8 and 9 relationships—in a direction towards and away from the flexible sheet 12—by moving both of the cooling rolls 20a, 26a relative to their respective frame 62, 68. Alternatively, either of the cooling rolls 20a, 26a might be fixed, whereby the other of the cooling rolls 20a, 26a is moved selectively towards and away therefrom and from the flexible sheet 12 to realize the different configurations in FIGS. 8 and 9.

In FIG. 7, the sheet processing system 18 is changed from the first state of FIG. 6 with the first and second cooling rolls 20a, 26a shown in the aforementioned second relationship, wherein the flexible sheet surface 24 is caused to engage the peripheral surface 30a over a wrap angle α, with the sheet surface 28 caused to engage the peripheral surface 32a over a wrap angle α1. The flexible sheet 12 may be supported downstream of the first cooling roll 20a such that the angles α, α1 are substantially equal. In this embodiment, there are separate rolls that effect this support and interact with the flexible sheet 12 in different manners, as further explained below. However, the basic principles of operation are achievable with just the first and second cooling rolls 20a, 26a relatively repositionable as shown and described.

Further, one or both of the cooling rolls 20a, 26a are movable selectively in a direction towards or away from the flexible sheet 12 in the processing path to produce the relationships shown in FIGS. 6 and 7. The movement of the cooling roll 28, if it occurs, is along the line of the double-headed arrow 78, with the corresponding movement of the cooling roll 26a, if it occurs, taking place along the line of the double-headed arrow 80. The paths towards and away from the advancing flexible sheet 12 may be orthogonal to the sheet path, as depicted, or at a different angle to the sheet path.

In the FIG. 7 relationship, further relative movement between the cooling rolls 20a, 26a, towards the sheet and each other from the FIG. 7 relationship, further increases the wrap angles α, α1, whereas a greater spacing reduces the wrap angles α, α1 until there is effectively point contact between the peripheral surfaces 30a, 32a and the flexible sheet surfaces 24, 28, respectively.

In the embodiment depicted in FIGS. 4-9, rather than having individual and only two cooperating cooling rolls 20a, 26a, there are shown two like arrangements of cooperating rolls—five in number on each—at 82 and 84. Each of the five roll arrangements 82, 84 is shown to operate in the same manner and is capable of being in the same or different states as hereinbelow explained.

In the exemplary roll arrangement as shown at 82, and in detail in FIGS. 6-9, a third cooling roll 20b has a peripheral surface 30b to engage the surface 24 on the flexible sheet 12.

Third and fourth cooling rolls 26b, 26c have peripheral surfaces 32b, 32c to engage the flexible sheet surface 28.

The third cooling roll 20b has a third axis 86, with the fourth and fifth cooling rolls 32b, 32c having fourth and fifth axes 88, 90, respectively.

As depicted, the first and third cooling rolls 20a, 20b are connected to the support/carriage 60 to move together in relationship to the cooling rolls 26a, 26b, 26c while maintaining the relationship between the axes 72, 86.

Similarly, the cooling rolls 26a, 26b, 26c are mounted to the support/carriage 66 to move together with a maintained relationship between the axes 74, 88, 90.

While both of the supports/carriages 60, 66 might be movable to change the relationship between the cooling rolls on opposite sides of the flexible sheet 12, in this embodiment, the cooling rolls 26a, 26b, 26c remain fixed, with the cooling rolls 20a, 20b movable together relative thereto to achieve the different relationships shown in FIGS. 6-9. By fixing the support/carriage 66, the peripheral surfaces 32a, 32b, 32c collectively provide a support for the flexible sheet 12 that may be passed therealong without the need for cooling thereby as shown in FIGS. 6 and 8. That is, the cooling rolls 20a, 20b can remain spaced from the flexible sheet 12 while the flexible sheet 12 advances in the processing path through the roll arrangement 82.

Symmetrical cooling is commonly effected by having the same degree of circumferential contact with the cooling roll surfaces on opposite sides of the flexible sheet 12. In the arrangement shown, the wrap angle $\alpha$, al over the rolls 20a, 26a is the same in FIG. 7. The third and fourth cooling rolls 20b, 26b may cooperate with each other in similar fashion so that each has the same wrap angle contact with its respective sheet side.

To equalize the cooling contact area, the fifth cooling roll 32c may be a non-cooled roll which functions primarily to provide symmetrical support of the advancing flexible sheet 12 between the rolls 26a, 26b and 26b, 26c. As depicted in FIG. 7, the axes 72, 86 align along the processing path approximately midway between the axes 74, 88 and 88, 90, respectively.

As depicted in FIG. 7, the first cooling roll 20a has the same relationship with the second and fourth cooling rolls 26a, 26b as the third cooling roll 20b has with the fourth and fifth cooling rolls 26b, 26c, with the understanding that the fifth cooling roll 26c might not perform a cooling function.

It is also noted that the leading cooling roll in FIG. 7—26a—may be a non-cooling roll with the fifth roll 26c being a cooling roll that produces uniform wrap around the cooling rolls on opposite sides of the flexible sheet 12.

As seen in the FIG. 7 relationship, the flexible sheet 12 is captive between the first cooling roll 20a and the second and fourth cooling rolls 26a, 26b and is likewise captive between the third cooling roll 20b and the fourth and fifth cooling rolls 26b, 26c. In the FIG. 9 configuration, the flexible sheet 12 is captive between the first and second rolls 20a, 26a and between the third and fourth cooling rolls 20b, 26b but is not captive between the third and fifth cooling rolls 20b, 26c. With this point contact arrangement, the planes containing the axes 72, 74 and 86, 88 are substantially parallel and orthogonal to the processing path, which is substantially straight as supported by the rolls 26a, 26b, 26c. Again, the roll 26c may be a non-cooling roll that functions primarily as a support for the advancing flexible sheet 12.

As depicted in FIG. 7, the same planes through the axes 72, 74 and 86, 88 are parallel to each other but have a different angular relationship with respect to the advancing flexible sheet 12.

Accordingly, with one or more cooling rolls on opposite sides of the flexible sheet 12, two manners of relatively moving the rolls on opposite sides of the flexible sheet are contemplated. In a first manner, assuming for purposes of simplicity that only the support/carriage 60 is movable in FIG. 6, the support/carriage 60 is movable towards and away from the advancing flexible sheet, and in this case substantially orthogonally to a plane containing the axes 74, 88 of the second and fourth cooling rolls 26a, 26b.

The second manner of relative movement involves changing a relationship between the roll(s) along the processing path on opposite sides of the flexible sheet.

The roll arrangement 84 may be the same as the roll arrangement 82. However, this is not a requirement, as different roll arrangements might be devised to achieve the desired cooling.

As depicted, the support/carriage 66' on the roll arrangement 84, corresponding to the support/carriage 66, is either fixed to the support/carriage 66 or is capable of assuming the FIG. 5 position. The components are all relatively dimensioned in FIG. 5 so that the roll arrangement 82 has the FIG. 7 relationship with the flexible sheet 12, whereas at the same time the roll arrangement 84 has the FIG. 9 relationship with the flexible sheet 12.

Again, it should be noted that the different component combinations shown are potential building blocks that can be modified, mixed and matched, etc. to tweak the cooling to maximize efficiency of heat transfer and effect uniform cooling on opposite sides of the flexible sheet 12. Further, cooling can be strategically controlled by changing relative diameters, relationships between the rolls, temperatures, etc. throughout the sheet processing system 18.

The ability to reconfigure allows components on a single system to be repositioned to, for example, accommodate different sheets with different cooling contact, or support requirements. For example, some sheets may excessively sag with the FIG. 7 configuration necessitating an adjustment to the FIG. 9 configuration or an intermediate state. The spanning of the sheet over the successive pairs of rolls 26a, 26b, and 26b, 26c allows a significant unsupported length whereat the flexible sheet 12 may be pressed by the rolls 20a, 20b to produce significant wrap, which may be appropriate for thicker sheets.

In the event that there are multiple rolls on opposite sides of the flexible sheet 12, it is also contemplated that all of the rolls on one or both sides of the flexible sheet might be movable independently to afford the two dimensions/manners of movement possible through the support/carriage arrangement described above to give greater flexibility in terms of system reconfiguration.

It is contemplated that the drive 34, as depicted schematically in FIG. 3, might be utilized to drive one, more than one, or all of the rolls making up the roll arrangement 82, 84.

The drive 36, depicted schematically in FIG. 3, might consist of a drive force input 92 as shown in FIG. 4.

With the drive 34 connected to the exemplary first cooling roll 20a, only for purposes of explanation, a slip clutch 94 may be provided between the drive force input 96 and the cooling roll 20a.

As shown schematically in FIG. 3, the drive 34 may have an associated chain 97 connected to any one, multiple, or all of the rolls on each roll arrangement 82, 84. With appreciable sheet wrap, driving of the rolls may be particularly advantageous.

As noted above, one, some, or all of the rolls may be followers that are frictionally driven by the advancing sheet.

While the system can be used with flexible sheets of virtually any thickness, it is particularly adaptable to thicker sheet material—on the order of three millimeters or more—which tends to maintain a straight configuration, thus generally not benefiting appreciably from enhanced cooling through increased wrap made possible by the roll rearrangement allowed with the system as set forth herein. That is, the FIG. 7 roll arrangement can be set to produce a significant wrap angle that causes cooling at a faster rate than with the FIG. 9 roll arrangement.

It is also possible that any two of the cooperating rolls making up the roll arrangements could be dimensioned and controlled to perform a calibrating function as the advancing flexible sheet travels to and through a gap between the rolls.

The system may incorporate one or more stops S1, S2, as shown schematically in FIG. 2, which prevent direct contact between cooperating roll pairs in the system. As depicted, the stops are associated with the representative cooling rolls 20, 26. If only one of the rolls 20, 26 is movable towards the other, in either dimension of movement, only one such stop S1, S2 may be required.

It is also conceivable that the invention might be practiced to actually heat one or both of the sheet surfaces 30, 32 to a temperature above that of the core. For purposes of simplicity, this variation is intended to be encompassed by the same "cooling roll" terminology in the description and claims herein.

Figure 10:
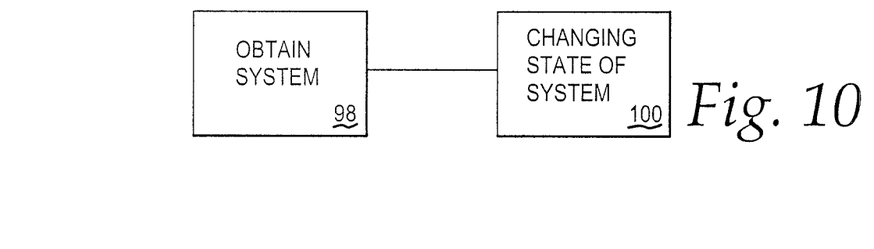
FIG. 10 is a flow diagram representation of a method of processing a flexible sheet according to the invention.

A method of processing a flexible sheet, according to the invention, is shown in flow diagram form in FIG. 10.

As shown at block 98, a system as described above is obtained.

As shown at block 100 in FIG. 10, the state of the system is changed at different times in operation between: a) a first state wherein the advancing flexible sheet moves between the first and second cooling rolls without being captive between the first and second cooling rolls; b) a second state wherein the advancing flexible sheet contacts the first peripheral surface of the first cooling roll over the first circumferential extent and the second cooling roll with the first and second cooling rolls in the first relationship; and c) a third state wherein the advancing flexible sheet contacts the first peripheral surfaces of the first cooling roll over the second circumferential extent and the second cooling roll with the first and second cooling rolls in the second relationship.

The foregoing disclosure of specific embodiments is intended to be illustrative of the broad concepts comprehended by the invention.

The invention claimed is:

1. A method of processing a flexible sheet, the method comprising the steps of:
    forming the flexible sheet through an extrusion process, the sheet having first and second oppositely facing surfaces;
    obtaining a sheet processing system comprising at least a first cooling roll having a first peripheral surface for contacting the first sheet surface and movable around a first axis; and
    at least a second cooling roll having a second peripheral surface for contacting the second sheet surface and movable around a second axis,
    the first and second cooling rolls having an operative relationship wherein the first and second axes are substantially parallel,
    the system configured so that the first and second cooling rolls are mounted to be selectively movable in relationship to each other in a manner, including other than by moving one or both of the first and second cooling rolls in a direction towards or away from the flexible sheet, between: a) a first relationship wherein the first sheet surface is caused to engage the first peripheral surface over a first circumferential extent as the flexible sheet is advanced in the processing path; and b) a second relationship wherein the first sheet surface is caused to engage the first peripheral surface over a second circumferential extent that is different than the first circumferential extent as the flexible sheet is advanced in the processing path,
    with the flexible sheet not fully set and in a heated state, advancing the flexible sheet in a processing path between an upstream location and a downstream location,
    the flexible sheet advancing in the processing path moving directly between the first and second cooling rolls,
    wherein the first and second cooling rolls are movable in relationship to each other including by translating one of the first and second cooling rolls relative to the other of the first and second cooling rolls along the processing path,
    wherein the at least first cooling roll comprises the first cooling roll and a third cooling roll with a third axis,
    wherein the flexible sheet advancing in the processing path moves between the second and third cooling rolls,
    wherein the sheet processing system further comprises a carriage to which the first and third cooling rolls are mounted, the carriage movable together with the first and third cooling rolls relative to the second cooling roll to change the first and second cooling rolls between the first and second relationships,
    the first and third cooling rolls connected to the carriage so that there is a fixed relationship between the first and third axes that is maintained as the first and second cooling rolls are changed between the first and second relationships.

2. The method of processing a flexible sheet according to claim 1 further comprising the steps of changing a state of the sheet processing system at different times and operating the sheet processing system in: a) a first state wherein the advancing flexible sheet moves between the first and second cooling rolls without being captive between the first and second cooling rolls; b) a second state wherein the advancing flexible sheet contacts the first peripheral surface of the first cooling roll over the first circumferential extent and the second cooling roll with the first and second cooling rolls in the first relationship; and c) a third state wherein the advancing flexible sheet contacts the first peripheral surface of the first cooling roll over the second circumferential extent and the second cooling roll with the first and second cooling rolls in the second relationship.

3. The method of processing a flexible sheet according to claim 2 further including the step of calibrating the flexible sheet between the first and second cooling rolls with the sheet processing system in the second state.

4. The method of processing a flexible sheet according to claim 1 wherein the at least second cooling roll comprises the second cooling roll and a fourth cooling roll with a fourth axis, and including the step of moving the carriage to thereby move the first cooling roll selectively towards and away from a plane containing the second and fourth axes.

5. The method of processing a flexible sheet according to claim 1 wherein the at least second cooling roll comprises the second cooling roll and a fourth cooling roll with a fourth axis, and including the step of moving the carriage to thereby move the first and third cooling rolls along the processing path and relative to the second and fourth cooling rolls.

6. The method of processing a flexible sheet according to claim 1 wherein the flexible sheet has a thickness of at least 3 millimeters.

7. The method of processing a flexible sheet according to claim 1 wherein at least one of the first and second cooling rolls is temperature controlled so that a temperature of at least one of the first and second peripheral surfaces is below ambient temperature.

8. The method of processing a flexible sheet according to claim 1 wherein at least one of the first and second cooling rolls is driven to cause a respective peripheral surface thereon to generate a frictional driving force tending to move the flexible sheet in the processing path.

9. The method of processing a flexible sheet according to claim 1 wherein only one of the first and second cooling rolls is movable relative to the other of the first and second cooling rolls in changing the first and second cooling rolls between the first and second relationships.

10. The method of processing a flexible sheet according to claim 1 wherein with the first and second cooling rolls in the first relationship, there is substantially a point contact of the flexible sheet with each of the first and second cooling rolls.

11. The method of processing a flexible sheet according to claim 1 wherein the at least second cooling roll comprises the second cooling roll and a fourth cooling roll with a fourth axis.

12. The method of processing a flexible sheet according to claim 11 wherein the carriage is movable relative to the second and fourth cooling rolls to change the first and second cooling rolls between the first and second relationships.

13. The method of processing a flexible sheet according to claim 12 wherein the third and fourth cooling rolls have a same relationship with each other as the first and second cooling rolls have with each other.

14. The method of processing a flexible sheet according to claim 12 wherein a first plane containing the first and second axes is substantially parallel to a second plane containing the third and fourth axes.

15. The method of processing a flexible sheet according to claim 12 wherein the first axis resides midway between the second and fourth axes along the processing path.

16. The method of processing a flexible sheet according to claim 12 wherein the at least second cooling roll comprises the second cooling roll, the fourth cooling roll, and a fifth cooling roll with a fifth axis and the carriage is movable into one position wherein the first cooling roll has a same relationship with the second and fourth cooling rolls as a relationship the third cooling roll has with the fourth and fifth cooling rolls.

17. The method of processing a flexible sheet according to claim 16 wherein with the carriage in the one position the flexible sheet is captive between: a) the first cooling roll and the second and fourth cooling rolls; and b) the third cooling roll and the fourth and fifth cooling rolls, and the carriage is movable into a second position that is different than the one position wherein: i) the flexible sheet is captive between the first and second cooling rolls and the third and fourth cooling rolls; and ii) the flexible sheet is not captive between the third and fifth cooling rolls.

18. The method of processing a flexible sheet according to claim 12 wherein the carriage is movable selectively towards and away from a plane containing the second and fourth cooling roll axes.

19. The method of processing a flexible sheet according to claim 12 wherein the sheet processing system further comprises a drive assembly generating a force downstream of the carriage for advancing the flexible sheet in the processing path.

20. The method of processing a flexible sheet according to claim 8 wherein there is a slip clutch on the at least one of the first and second cooling rolls that is driven.

* * * * *

UNITED STATES PATENT AND TRADEMARK OFFICE
CERTIFICATE OF CORRECTION

PATENT NO. : 11,890,801 B2
APPLICATION NO. : 16/536519
DATED : February 6, 2024
INVENTOR(S) : Dana R. Hanson et al.

It is certified that error appears in the above-identified patent and that said Letters Patent is hereby corrected as shown below:

In the Claims

Claim 1 Should read:
1. A method of processing a flexible sheet, the method comprising the steps of:
forming the flexible sheet through an extrusion process, the sheet having first and second oppositely facing surfaces;
obtaining a sheet processing system comprising at least a first cooling roll having a first peripheral surface for contacting the first sheet surface and movable around a first axis; and
at least a second cooling roll having a second peripheral surface for contacting the second sheet surface and movable around a second axis,
the first and second cooling rolls having an operative relationship wherein the first and second axes are substantially parallel,
the system configured so that the first and second cooling rolls are mounted to be selectively movable in relationship to each other in a manner, including other than by moving one or both of the first and second cooling rolls in a direction towards or away from the flexible sheet, between: a) a first relationship wherein the first sheet surface is caused to engage the first peripheral surface over a first circumferential extent as the flexible sheet is advanced in the processing path; and b) a second relationship wherein the first sheet surface is caused to engage the first peripheral surface over a second circumferential extent that is different than the first circumferential extent as the flexible sheet is advanced in the processing path,
with the flexible sheet not fully set and in a heated state, advancing the flexible sheet in a processing path between an upstream location and a downstream location,
the flexible sheet advancing in the processing path moving between the first and second cooling rolls,
wherein the first and second cooling rolls are movable in relationship to each other including by translating one of the first and second cooling rolls relative to the other of the first and second cooling rolls along the processing path,
wherein the at least first cooling roll comprises the first cooling roll and a third cooling roll with a third axis,
wherein the flexible sheet advancing in the processing path moves between the second and third cooling rolls, Signed and Sealed this
Twenty-fifth Day of June, 2024

Katherine Kelly Vidal
*Director of the United States Patent and Trademark Office* wherein the sheet processing system further comprises a carriage to which the first and third cooling rolls are mounted, the carriage movable together with the first and third cooling rolls relative to the second cooling roll to change the first and second cooling rolls between the first and second relationships, the first and third cooling rolls connected to the carriage so that there is a fixed relationship between the first and third axes that is maintained as the first and second cooling rolls are changed between the first and second relationships.